United States Patent
Spertus et al.

(10) Patent No.: US 7,805,717 B1
(45) Date of Patent: Sep. 28, 2010

(54) PRE-COMPUTED DYNAMIC INSTRUMENTATION

(75) Inventors: Michael P. Spertus, Chicago, IL (US); Christopher D. Metcalf, Wellesley, MA (US); Gadi Wolfman, Hetzliya (IL)

(73) Assignee: Symantec Operating Corporation, Mountain View, CA (US)

( * ) Notice: Subject to any disclaimer, the term of this patent is extended or adjusted under 35 U.S.C. 154(b) by 1379 days.

(21) Appl. No.: 11/252,343

(22) Filed: Oct. 17, 2005

(51) Int. Cl.
*G06F 9/45* (2006.01)
*G06F 9/44* (2006.01)
(52) U.S. Cl. ................... 717/158; 717/130; 717/152
(58) Field of Classification Search ............. 717/130, 717/158
See application file for complete search history.

(56) References Cited

U.S. PATENT DOCUMENTS

| | | | |
|---|---|---|---|
| 5,455,949 A | 10/1995 | Conder et al. | |
| 6,553,564 B1 * | 4/2003 | Alexander et al. | 717/128 |
| 6,678,883 B1 * | 1/2004 | Berry et al. | 717/128 |
| 6,728,955 B1 | 4/2004 | Berry et al. | |
| 6,742,178 B1 * | 5/2004 | Berry et al. | 717/130 |
| 6,754,890 B1 * | 6/2004 | Berry et al. | 717/128 |
| 6,760,903 B1 * | 7/2004 | Morshed et al. | 717/130 |
| 6,779,187 B1 | 8/2004 | Hammond | |
| 6,792,460 B2 * | 9/2004 | Oulu et al. | 709/224 |
| 7,003,765 B1 | 2/2006 | Venkatasubramanian et al. | |
| 7,007,026 B2 | 2/2006 | Wilkinson et al. | |
| 7,007,269 B2 * | 2/2006 | Sluiman et al. | 717/130 |
| 7,047,521 B2 * | 5/2006 | Bunnell | 717/130 |
| 7,194,732 B2 * | 3/2007 | Fisher et al. | 717/131 |
| 7,266,810 B2 * | 9/2007 | Karkare et al. | 717/130 |
| 7,275,239 B2 * | 9/2007 | Cuomo et al. | 717/130 |
| 7,293,259 B1 * | 11/2007 | Dmitriev | 717/130 |
| 7,293,260 B1 * | 11/2007 | Dmitriev | 717/130 |
| 7,389,494 B1 * | 6/2008 | Cantrill | 717/125 |
| 7,401,324 B1 * | 7/2008 | Dmitriev | 717/130 |
| 7,424,705 B2 * | 9/2008 | Lewis et al. | 717/148 |

(Continued)

OTHER PUBLICATIONS

Matt Pietrek, "Under the Hood: The .NET Profiling API and the DNProfiler Tool", Dec. 2001, MDSN magazine, retrieved from <http://msdn.microsoft.com/en-us/magazine/cc301725.aspx>, pp. 1-7.*

(Continued)

*Primary Examiner*—Michael J Yigdall
*Assistant Examiner*—Marina Lee
(74) *Attorney, Agent, or Firm*—Rory D. Rankin; Meyertons, Hood, Kivlin, Kowert & Goetzel, P.C.

(57) ABSTRACT

A system and method for instrumenting program instructions. A processing system includes a compiler and a profiler. The compiler is configured to notify the profiler of a compilation event corresponding to first program instructions. In response to detecting the event, the profiler is configured to intercept compilation of the first program instructions, determine whether an instrumented version of the first program instructions is currently available, instruct the compiler to compile the instrumented version of the first program instructions if available, and retrieve and instrument the first program instructions if not available. The profiler may maintain an instrumentation cache for storing instrumented versions of program instructions. The instrumentation cache may further include metadata which identifies portions of program code which have been instrumented and their location. The profiler may generally instrument program instructions once during the resident life of a corresponding application.

23 Claims, 5 Drawing Sheets

U.S. PATENT DOCUMENTS

| | | | |
|---|---|---|---|
| 7,493,604 B2 * | 2/2009 | Mariani | 717/148 |
| 7,496,903 B2 * | 2/2009 | Rees et al. | 717/130 |
| 7,500,227 B1 * | 3/2009 | Fontana et al. | 717/127 |
| 7,506,317 B2 * | 3/2009 | Liang et al. | 717/130 |
| 7,530,055 B1 * | 5/2009 | Leventhal et al. | 717/128 |
| 7,568,185 B1 * | 7/2009 | Shapiro et al. | 717/130 |
| 7,574,702 B2 * | 8/2009 | Goldin et al. | 717/148 |
| 7,577,943 B2 * | 8/2009 | Chilimbi et al. | 717/130 |
| 7,587,709 B2 * | 9/2009 | Chilimbi et al. | 717/130 |
| 7,620,941 B1 * | 11/2009 | Leventhal | 717/128 |
| 2002/0108102 A1 * | 8/2002 | Muhlestein et al. | 717/124 |
| 2003/0115583 A1 * | 6/2003 | Hundt et al. | 717/158 |
| 2004/0031020 A1 * | 2/2004 | Berry et al. | 717/130 |
| 2004/0054994 A1 * | 3/2004 | Demsey et al. | 717/148 |
| 2004/0123279 A1 * | 6/2004 | Boykin et al. | 717/158 |
| 2004/0128446 A1 * | 7/2004 | Dulong | 711/131 |
| 2004/0133882 A1 * | 7/2004 | Angel et al. | 717/130 |
| 2004/0163077 A1 * | 8/2004 | Dimpsey et al. | 717/130 |
| 2005/0091645 A1 * | 4/2005 | Chilimbi et al. | 717/130 |
| 2005/0091646 A1 * | 4/2005 | Chilimbi et al. | 717/130 |
| 2005/0102656 A1 * | 5/2005 | Viehland et al. | 717/130 |
| 2005/0155020 A1 * | 7/2005 | DeWitt et al. | 717/130 |
| 2005/0223365 A1 * | 10/2005 | Smith et al. | 717/128 |
| 2006/0015854 A1 * | 1/2006 | Muhlestein et al. | 717/130 |
| 2006/0101418 A1 * | 5/2006 | Barsness et al. | 717/130 |
| 2006/0101438 A1 * | 5/2006 | Mariani | 717/148 |
| 2006/0112037 A1 * | 5/2006 | Chagoly et al. | 706/20 |
| 2006/0277371 A1 * | 12/2006 | Cohn et al. | 711/147 |
| 2007/0006167 A1 * | 1/2007 | Luk et al. | 717/130 |
| 2007/0074171 A1 * | 3/2007 | Burka et al. | 717/127 |
| 2007/0079294 A1 * | 4/2007 | Knight et al. | 717/130 |

OTHER PUBLICATIONS

Aleksandr Mikunov, "Rewrite MSIL code on the Fly with the .NET Framework Profiling API", Sep. 2003, MSDN Magazin, retrieved from <http://msdn.microsoft.com/en-us/magazine/cc188743.aspx>, pp. 1-19.*

Breech et al., "Online Impact Analysis via Dynamic Compilation Technology", Nov. 11, 2004, Software mainternace, 2004, procedding. 20th IEEE International Conference publication date: Sep. 11-14, 2004, pp. 1-5.*

Arnold et al., "A Framework for reducing the cost of instrumented code", ACM, vol. 36, Issue 5 (May 2001), Year of Publication: 2001, ISSN:0362-1340, retrieved from <http://delivery.acm.org/10.1145/380000/378832/p168-arnold.pdf?key1=378832&key2=9412324721&coll=GUIDE&dl=GUIDE&CFID=90826467&CFTOKEN=51743884>,pp. 168-179.*

Olszewski et al., "JIT Instrumentation—A Novel Approach to Dynamically. Instrument Operating Systems", EuroSys' 07, Mar. 21-23, 2007, retrieved from <http://people.csail.mit.edu/mareko/jifl-eurosys07.pdf>, total pp. 14.*

Pócza et al., Towards Effective Runtime Trace Generation. Techniques in the .NET Framework>, .NET Technology 2006, retrieved from <http://gsd.web.elte.hu/contents/articles/dotnet06.pdf>, total pp. 8.*

Minukov, Aleksander, "Rewrite MSIL Code in the Fly with the .NET Framework Profiling API", MSDN Magazine, 2007, pp. 1-9.

Veritas, Veritas Indepth for Microsoft .NET, Installation and Administration Guide, Copyright 2005, Mountain View, CA, pp. 1-40.

* cited by examiner

PRE-COMPUTED DYNAMIC INSTRUMENTATION

BACKGROUND OF THE INVENTION

1. Field of the Invention

This invention relates to computer processes and, more particularly, to the instrumentation of computer application code.

2. Description of the Related Art

In order to gain a fuller understanding of the operation of software processes, it is common to employ any of a variety of monitoring, profiling, and/or analysis programs in conjunction with the software processes to be understood. Such monitoring, profiling, and analysis programs which, for simplicity, may collectively be referred to as "profilers", are available from many vendors or may be custom-made for specific applications. As part of a profiling or monitoring process, application code may be "instrumented" by adding instructions (i.e., code) sometimes referred to as "probes" to an application's original code. These probes may then generate additional data concerning the operation of the application during runtime.

Traditionally, there have been two general approaches to the instrumentation of application code. One approach is static instrumentation, and the other approach is dynamic instrumentation. However, both of these approaches have disadvantages. Static instrumentation generally involves replacing an application's original executables with instrumented executables. However, such an approach can be difficult to manage. One difficult with managing statically instrumented applications is the user needs to know which executables make up their application, and which executable are instrumented and non-instrumented. Another problem with static instrumentation is that digitally-signed code generally cannot be instrumented. If a digitally signed assembly, library, or other code is instrumented, the process which loads the instrumented code may reject it due to a failed signature verification.

In dynamic instrumentation, application code (e.g., intermediate code) may be instrumented at the time the code is actually loaded for execution. For example, in the Microsoft®.NET framework, bytecodes may be instrumented when a method or assembly is loaded for just in time (JIT) compilation. Alternatively, code may be instrumented when a class is loaded in a Sun® Microsystems®' Java® environment. While the dynamic approach may avoid the need for replacing deployed executables on disk, it may also entail significant performance implications due to the overhead involved. Further, it may also be very difficult to support and maintain code while using a dynamic instrumentation approach, because no instrumented files are generated that can be sent to support.

In view of the above, an effective and efficient method and mechanism for instrumenting application code is desired.

SUMMARY OF THE INVENTION

Systems and methods for managing the instrumentation of program code are contemplated.

A processing system is contemplated which includes a compiler and a profiler. The system is configured to support registration by various components for notification of events. The compiler is configured to notify the profiler of a compilation event corresponding to first program instructions. Responsive to the event, the profiler is configured to intercept compilation of the first program instructions. The profiler is then configured to determine whether an instrumented version of the first program instructions is currently available. If an instrumented version is already available, the profiler directs the compiler to the already instrumented version and the compiler compiles the previously instrumented version. If the profiler determines that an instrumented version is not currently available, the profiler is configured to retrieve and instrument the first program instructions. The newly instrumented version is then stored in an instrumentation cache and provided to the compiler for compilation.

Also contemplated is an instrumentation system and method, where a profiler generates and stores metadata corresponding to program instructions which have been instrumented. The metadata may indicate both the presence of instrumented versions of particular code, and the locations of instrumented versions of code. In one embodiment, the profiler may generally instrument program instructions only once during the resident life of a corresponding application.

These and other embodiments will become apparent upon reference to the following description and accompanying figures.

Figure 1:
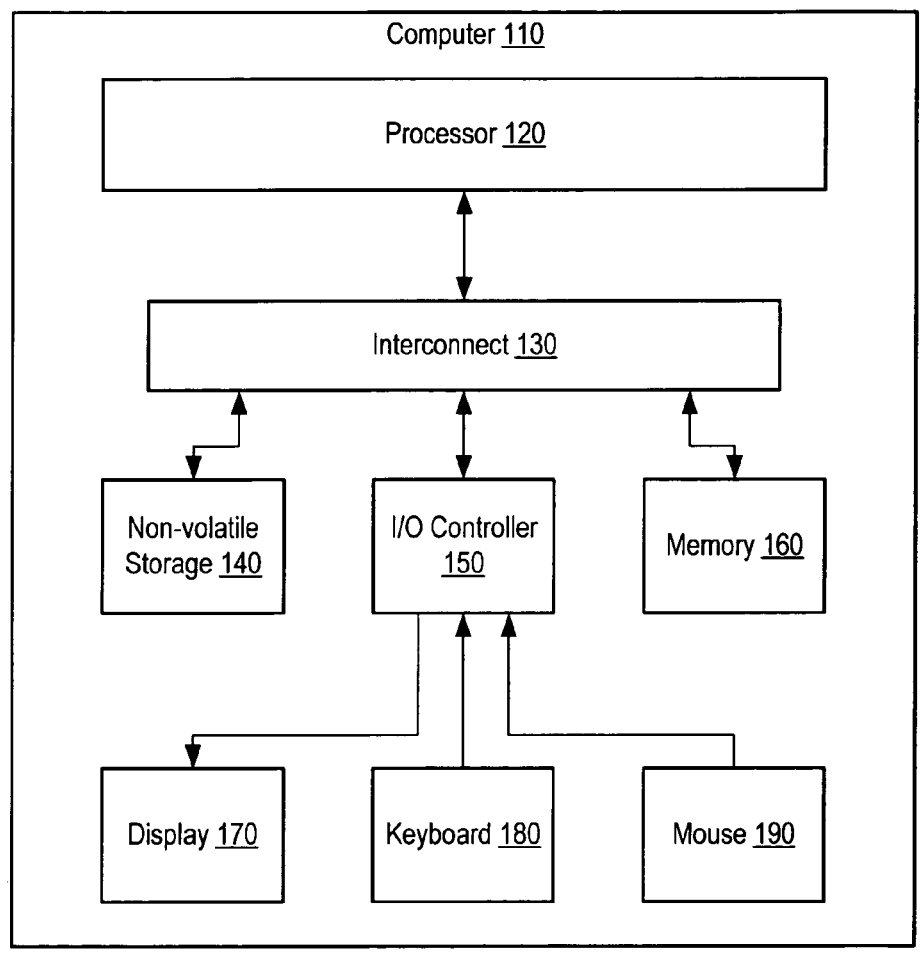
FIG. 1 illustrates one embodiment of a computer including a processor.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein.

FIG. 1 illustrates one embodiment of a computer 110 including a processor 120. Processor 120 is shown coupled through an interconnect 130 to a non-volatile storage 140, an I/O controller 150, and a memory 160. I/O controller 150 may be coupled to a display 170, a keyboard 180, and a mouse 190. A variety of other peripheral devices such as boot devices and network interfaces may be coupled to I/O controller 150 as well as or instead of those described above. In addition, interconnect 130 may couple a variety of other devices to processor 120 depending on the desired functionality of computer 110.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM®, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In some embodiments, computer 110 may be configured as a client system rather than a server system.

In one embodiment, processor 120 may be configured to run operating system software such as a Microsoft® Windows® operating system, IBM® AIX® operating sysetm or Sun Microsystems Solaris® operating system. Operating system software may in turn provide an environment in which processor 120 may execute additional software modules in the form of applications, programs, or processes designed to perform specific functions. Running operating system software or software modules may comprise executing instructions that are stored in memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160. In one embodiment, one or more software processes may perform the function of profiling other software processes during operation, gathering and storing data indicative of the operation of one or more of the other software processes.

Figure 2:
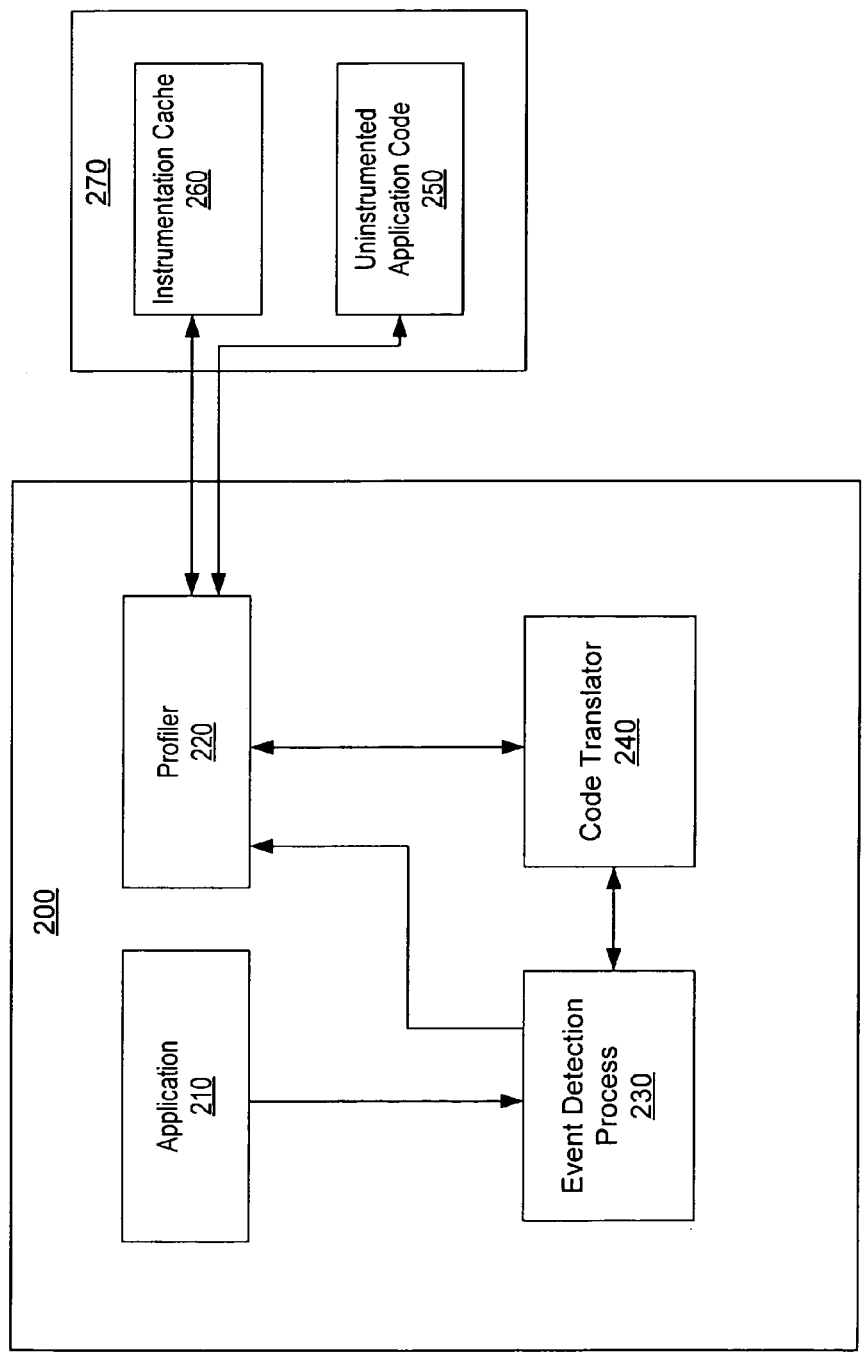
FIG. 2 illustrates one embodiment of computing system configured to support instrumentation of program code.

Turning now to FIG. 2, one embodiment of various components of a computing system are depicted. In the illustrated embodiment, software processes 200 are shown to include an application process 210, event detection process 230, code translator 240, and profiler 220. Also shown is a storage device 270 which includes uninstrumented application code 250 and an instrumentation cache 260. Storage device 270 may generally comprise non-volatile storage such as a hard disk(s). However, those skilled in the art will appreciate that numerous types of storage devices and technologies—volatile or non-volatile—may be utilized to store data.

Generally speaking, FIG. 2 provides a high level view of a system which is configured to support the instrumentation of application code for monitoring, profiling, or any other desired purpose. In one embodiment, a computing system's runtime environment is configured to support dynamic translation of application code at the time of loading or execution. For example, in one embodiment, uninstrumented application code 250 may comprise an application's original uninstrumented code which is stored on a disk 270. Such code 250 may comprise an intermediate representation, such as a bytecode representation, or some other representation which is generally portable across computing platforms. Some examples of systems configured to use intermediate representations include Microsoft®'s .NET framework and some versions of Sun® Microsystems®' Java® language. Other embodiments may utilize computing platform specific representations, whether intermediate or not.

In an embodiment wherein the application code 250 is an intermediate representation, compilation of the application code 250 from the intermediate representation to a native language which is specific to a given platform may be performed at the time the application code 250 is loaded for execution. Generally speaking, when the application code 250 is loaded for execution, a code translator or compiler 240 may be invoked to translate the application code 250 to the native language. Code translator 240 may, for example, comprise a just-in-time (JIT) compiler or similar component. The translated or compiled application code 210 may then be executed. In some embodiments, when an application 250 is loaded for execution, all code of the application 250 may be translated, compiled, or otherwise made ready for execution. However, in other embodiments, certain portions of the application code 250 may not be translated or compiled until needed. For example, in one embodiment, particular functions or methods of an application may not be translated until such functions or methods are encountered (e.g., "called" or "invoked") during execution of the corresponding application code 210. Rather, when the application code 250 is initially loaded, only the calls to such functions or methods themselves are translated. When the function or method is required during execution, the corresponding code 250 is located, translated by the translator 240, and executed.

In one embodiment, profiler 220 is configured to instrument application code by inserting additional code, or otherwise modifying existing code of an application. Such a profiler 220 may be configured to instrument the application code 250 on disk prior to the application being loaded. Alternatively, or in addition to the above, profiler 220 may be configured to instrument application code dynamically at the time the code 250 is loaded for execution.

In one embodiment, profiler 220 may be configured to register with the underlying software subsystem to receive notification of various events. When such an event is detected by an event detection process 230, the profiler 220 is notified of the event's occurrence. Upon notification of a particular event, the profiler 220 may then take some action. In one embodiment, the profiler 220 registers to be notified when code translator 240 is preparing to translate or compile application code. Notification of the compilation event may also include some identification of the application code (e.g., function or method) which is to be compiled. In response to the notification, profiler 220 may be configured to retrieve the identified application code 250 and instrument or modify the intermediate code prior to the code being translated by code translator 240. After instrumenting the code, the profiler 220 is configured to direct the translator 240 to the instrumented version of the code. The translator 240 may then translate or compile the instrumented version of the code which may then be executed.

In addition to the above, profiler 220 may also be configured to maintain an instrumentation cache 260 which is configured to store application code 250 which has been instrumented or otherwise modified. In an embodiment including the instrumentation cache 270, profiler 220 may be configured to access the instrumentation cache 260 in order to determine whether particular application code 250 has previously been instrumented or modified. If a previously instrumented version is found, the profiler 220 may simply provide the previously instrumented version to the code translator 240 for translation. In this manner, as the code was previously instrumented, the process of instrumenting the code may be bypassed on this occasion and the overhead and latencies associated with instrumentation may be eliminated.

In the embodiment of FIG. 2, it is noted that the original application code 250 remains on disk in an unmodified form. However, in addition to the original code 250, an instrumented version of the code is also created and stored in instrumentation cache 260. Accordingly, application code may be instrumented in a dynamic manner, while also having stored versions of the instrumented code. Having the stored instrumented versions available may facilitate debug or other diagnostic efforts when problems arise with the computing system.

Figure 3:
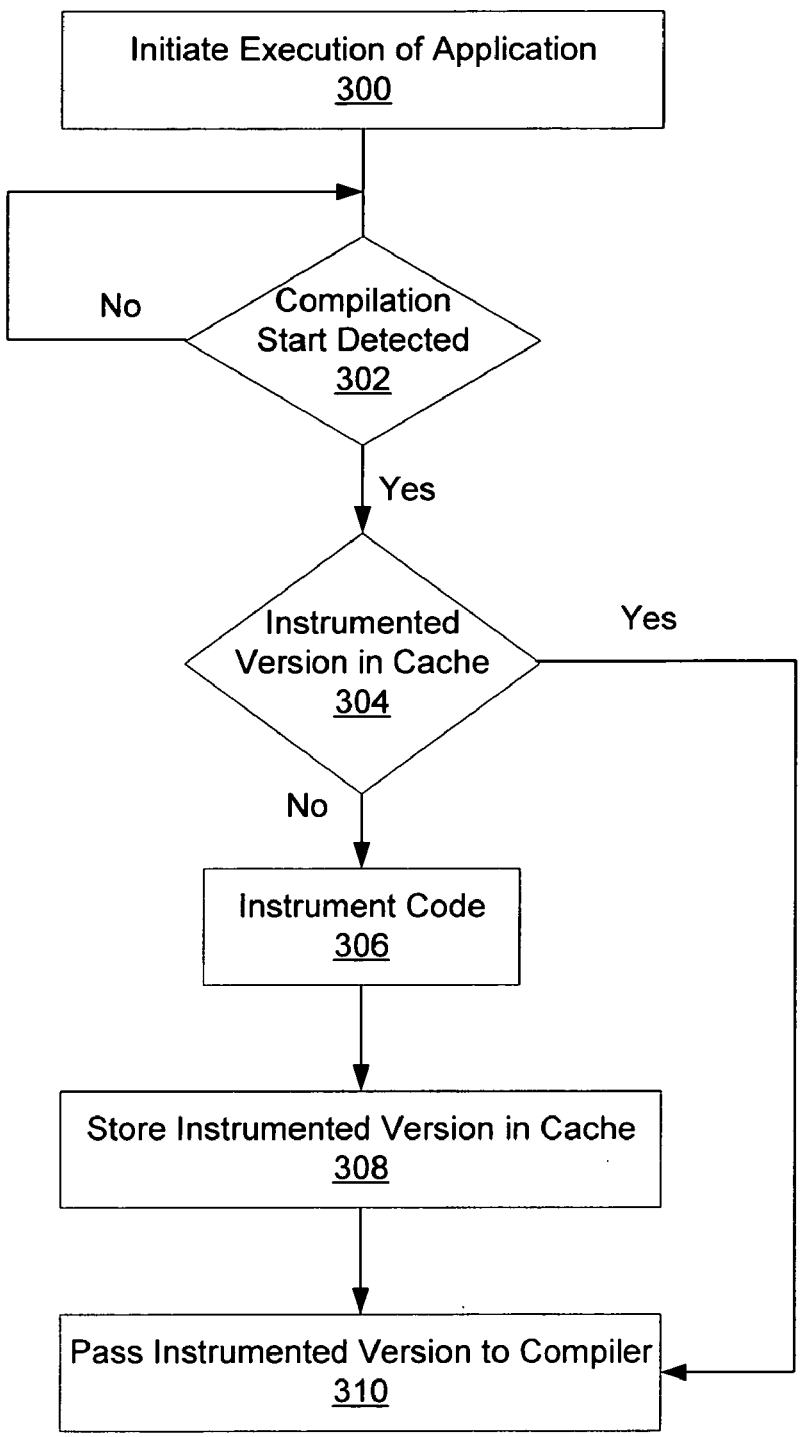
FIG. 3 illustrates one embodiment of a method for instrumenting program code.

FIG. 3 provides a flowchart illustrating one embodiment of a general process for instrumenting code. First, execution of an application is initiated (block 300). Such initiation may, for example, generally correspond to the initial loading of an application from a storage device. Assuming at least some portion of the application code requires translation or compilation, a compilation start event (decision block 302) may be detected by an instrumentation process. As described above, a profiler may take advantage of an existing "hook" within the software system which allows the profiler to receive notification of various events. For example, the profiler may have previously registered to receive notification of such events via a callback or other service. In other embodiments, an instrumentation process may detect such events via alternative mechanisms such as through a polling process.

Upon detection of the compilation start event (decision block 302), a profiler may check an instrumentation cache (decision block 304) to determine whether the code which is to be compiled has previously been instrumented. Various mechanisms may be utilized to determine whether particular code has been previously instrumented. For example, when a compilation start event is detected, the event may also provide some identification of the code to be compiled. Such an identification may comprise a token, address, or other identifier which corresponds to the code. The profiler may maintain metadata including an index or list which itself includes the token, address, or identifier. The presence of the identifier in the list may serve to indicate an instrumented version of the code is available. In addition, the metadata may also identify the location of the instrumented version (e.g., within the instrumentation cache). In this manner, the profiler may quickly identify if particular code has already been instrumented, and, if so, locate the instrumented version.

If a previously instrumented version of the application code is found in an instrumentation cache (decision block 304), then the instrumented version of the code may be made available to the compiler (block 310). However, if no previously instrumented version of the code is found in the instrumentation cache, then the instrumenter may obtain the code which is to be compiled and instrument the obtained code (block 306). Subsequent to instrumenting the code, the instrumenter may then store an instrumented version of the code, as well as corresponding metadata, in an instrumentation cache (block 308) and provide the instrumented version to the compiler (block 310). It is noted that blocks 308 and 310 may occur in any order, or concurrently.

Figure 4:
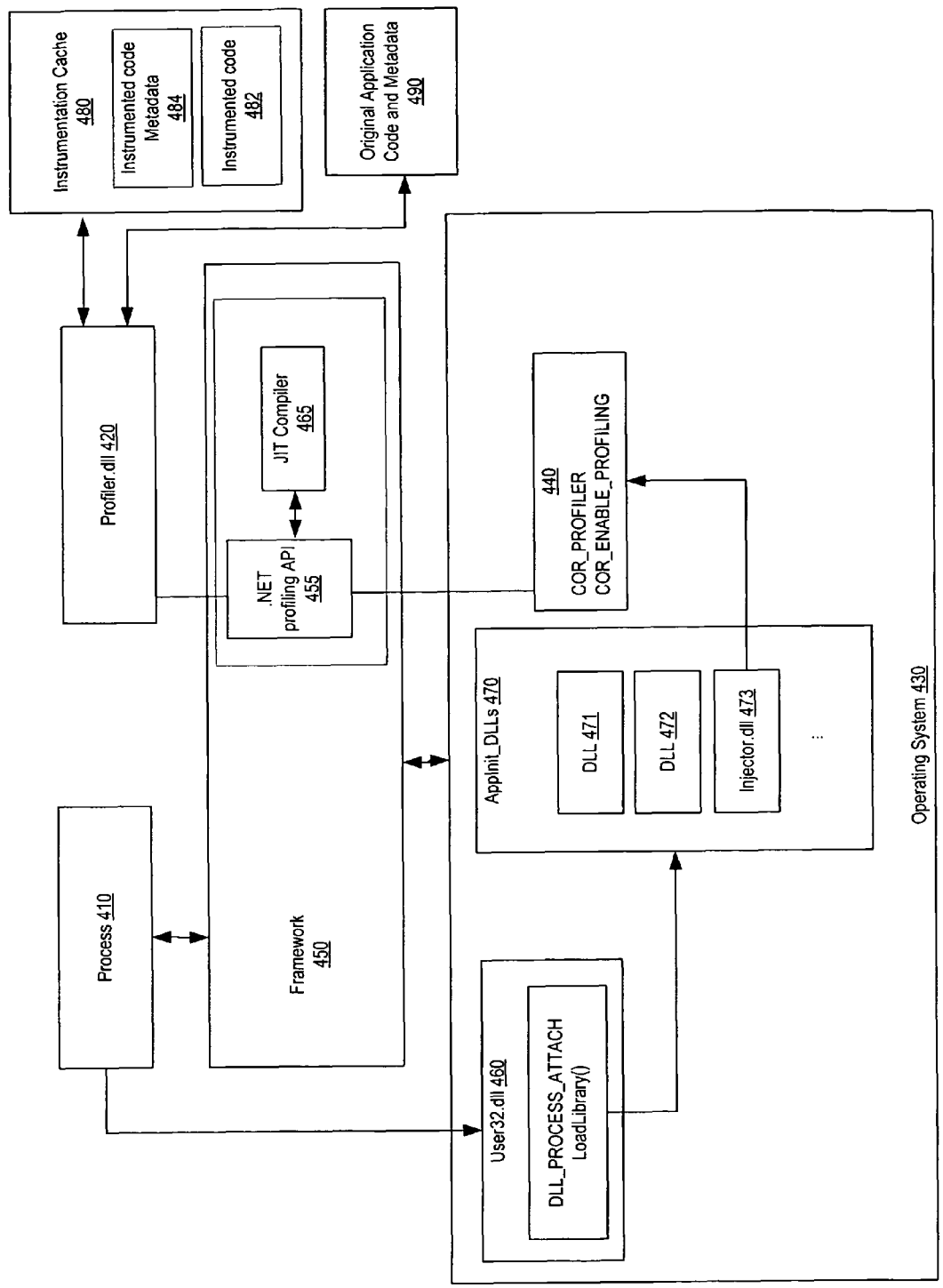
FIG. 4 illustrates one embodiment of computing system configured to support instrumentation of program code.

Turning now to FIG. 4, one embodiment of a software system is illustrated which includes components based on a Microsoft® Windows® operating system and Microsoft®.NET framework. While a Microsoft® Windows® operating system and .NET framework are utilized for purposes of discussion, the methods and mechanisms described herein may be applied in other environments as well. In the illustrated embodiment, a process 410 and a profiler 420 are shown coupled to a .NET framework 450 which may be supported by a Microsoft® Windows® operating system (Windows) 430. Process 410 may be, for example, an active server page (ASP) conforming to the ASP-.NET specification. Windows 430 may be one of Windows® 98, Windows® 2000, Windows® XP, or any other version of the Microsoft® Windows® operating system with which .NET framework 450 is compatible. In one embodiment, .NET framework 450 includes a .NET profiling application programming interface (API) 455. Profiler 420 may be an application written to use the functionality provided by the .NET profiling API 455 and configured to instrument application code.

In addition to the above, FIG. 4 illustrates an instrumentation cache 480, and original application code and metadata 490. In one embodiment, instrumentation cache 480 and original code 490 are stored on non-volatile storage such as a disk, but other storage mechanisms are possible and are contemplated. Also illustrated is a compiler or translator 465. Compiler 465 may comprise a just in time (JIT) compiler configured to compile from a portable intermediate code to a native code of a device on which the code is to be executed. As further illustrated in FIG. 4, Windows 430 may include environment variables (envars) 440, a User32.dll 460, and a list of AppInit_DLLs 470. Envars 440 are environment variables used by Windows 430 to establish an operating environment for each process that is launched. User32.dll is a dynamic link library that may be linked to user defined processes at the time of launch, such as process 410, that utilize the Windows user interface functionality.

In one embodiment, during the launch of process 410, Windows 430 may load various files or libraries into process 410 using a procedure referred to as dynamic linking. Specifically, in one embodiment, Windows 430 may load User32.dll 460 into process 410. As part of the loading procedure for a windows process, Windows may execute a function in User32.dll known as DLLMain with an argument of DLL_PROCESS_ATTACH. This function may execute a "LoadLibrary( )" function to load and initialize DLLs that are listed in AppInit_DLLs 470. AppInit_DLLS 470 may include user specified DLLs 471, 472, 473, etc., that may be dynamically linked to a process during initialization. In the illustrated embodiment, one of the AppInit_DLLs is an injector.dll 473. Injector.dll 473 may be configured to read a set of values for environment variables 440 from configuration file 480 and set the environment variables 440 for process 410 according to these values.

Two environment variables in particular may control profiling of process 410. The first, COR_ENABLE_PROFILING, enables or disables profiling of process 410. For example, setting COR_ENABLE_PROFILING may enable profiling and clearing COR_ENABLE_PROFILING may disable profiling. The second, COR_PROFILER, may be used to identify a particular profiler, such as profiler 420 which itself may comprise a DLL, to be used for instrumenting code corresponding to process 410. Accordingly, injector.dll 473 may retrieve and set values for environment variables COR_ENABLE_PROFILING and COR_PROFILER that apply to process 410 during the launch procedure. In one embodiment, child processes which are spawned by a parent process may inherit the environment, including environment variable settings, of the parent process. Accordingly, in one embodiment, injector.dll may be configured to establish particular environment settings for an application upon initialization of the application. Such settings may then be applied to all processes of the application throughout the life of the application (i.e., until all of the application processes are terminated). In one embodiment, injector.dll 473 may consult a configuration file (not shown) to determine whether a particular application is to be instrumented. In order to avoid the delay of reading from non-volatile storage, a copy of the configuration file may be maintained in memory for faster access.

Generally speaking, operation of the system depicted in FIG. 4 may be as follows. During installation or configuration of code corresponding to the profiler 420, the profiler 420 may be configured to register various software components with the underlying framework 450 and/or operating system 430. Such registration may include the registering of particular DLLs, such as profiler.dll 420. In addition, profiler.dll 420 may be configured to register to be notified of particular events as discussed above. In one embodiment, profiler.dll 420 registers to be notified of compilation events corresponding to the JIT compiler 465. In particular, profiler.dll 420 may be notified upon the occurrence of an event which indicates JIT compiler 465 is requesting or otherwise preparing to compile application code 490.

Upon detection of such an event, profiler 420 may determine (e.g., via a configuration file) whether the code which is to be compiled is to be instrumented. If the event corresponds to the initial loading of an application 490, profiler 420 may proceed with an instrumentation process as described below. Alternatively, if the event does not correspond to the initial loading of an application (e.g., a method is being invoked), profiler 420 may first perform a check to determine whether the code has already been instrumented and stored.

In the event of an initial loading of an application, uninstrumented application code 490 is retrieved for compilation. In one embodiment, application code 490 may comprise one or more assemblies suitable for use within a .NET framework 450. Generally speaking, an assembly may comprise a distributable library of related classes and a definition of their scope. Included with an assembly may also be a manifest which contains metadata describing the exported classes in the assembly, external dependencies required by the classes, various permissions for using the assembly, versioning information, and so on. In addition to the above, in one embodiment, application code 490 comprises an intermediate code (such as byte code) which has already gone through a compilation process from an original source language.

In one embodiment, JIT compilation occurs at the assembly level whenever an assembly is first loaded. Method or functions encountered during compilation of the assembly are not themselves compiled. Rather, an identifier (e.g., a stub) may be inserted for each such function or method. Only when a particular method is invoked, is the body of the method compiled from the intermediate code to the native language of the machine. Upon initiation of code compilation, JIT compiler 465 (or the underlying runtime) notifies the profiler 420. In one embodiment, compiler 465 may notify the profiler via the IcorProfilerCallback::JITCompilationStarted method of the .NET framework 450. Included in the notification to the profiler 420 is an identifier which may be utilized to identify the particular code to be compiled. In response, profiler 420 intercepts the compilation process and invokes the instrumenter to instrument a body of code which may comprise a superset of the code which is to be compiled using intermediate language instructions. Subsequent to instrumenting the code, the instrumenter stores the instrumented version 482 in the instrumentation cache 480. In addition, profiler 420 generates metadata 484 which may be used to identify and locate instrumented versions of application code within the instrumentation cache 480. In various embodiments, profiler 420 may be configured to only instrument selected methods of functions of a given assembly. In such a case, profiler 420 may not instrument application code 490 upon initial loading. However, even in such a case, profiler 490 may still generate and store metadata 484 corresponding to the application. Such metadata 484 may include the identification of various methods and functions of an application, but may also indicate such methods and/or functions have not yet been instrumented.

In response to detecting a JITCompilationStarted event corresponding to a method or function, profiler 420 may utilize a received identifier to identify the method or function to be compiled. The profiler 420 may then access instrumented code metadata 484 (which could be on disk, memory resident, etc.) to determine whether the corresponding method or function has been instrumented. If an instrumented version of the method is not available in the instrumentation cache 480, profiler 420 may then access code containing the body of the method to be compiled. For example, by accessing the assembly containing that code. The code can then be instrumented and placed in the instrumentation cache as described above.

Once instrumented code has been acquired by the profiler, various approaches may be used to modify the method body, including using the SetILFunctionBody method provided by the .NET framework 450. In addition, the profiler 420 stores a copy of the instrumented version of the method in the instrumentation cache 480. Further, the profiler 420 modifies the metadata 484 of the running process to contain all metadata required by the instrumented method. In one embodiment, profiler 420 may use the GetILFunctionBody method to obtain the method body. The profiler 420 may then instrument the method body prior to allowing the compilation process to continue. Further, the profiler 420 may modify the instrumented code metadata 484 to indicate the presence and location of the instrumented version of the code.

If in response to the detection of a JITCompilationStarted event, the profiler 420 determines an instrumented version of the code already exists in the instrumentation cache 480, the profiler 420 provides the JIT compiler 465 with a pointer or other identifier of the location of the instrumented version. It is noted that the JIT compiler 465 may not generally have any idea that the code being compiled is an instrumented version rather than an original version. Rather, the JIT compiler 465 simply proceeds with the compilation of the instrumented version of the code. In various embodiments, application code may include metadata which includes offsets to methods and functions included therein. When profiler 420 instruments code, such offsets may generally be changed. Therefore, the instrumented code metadata 484 generated by the profiler 420 may include a mapping of original offsets to new offsets.

Figure 5:
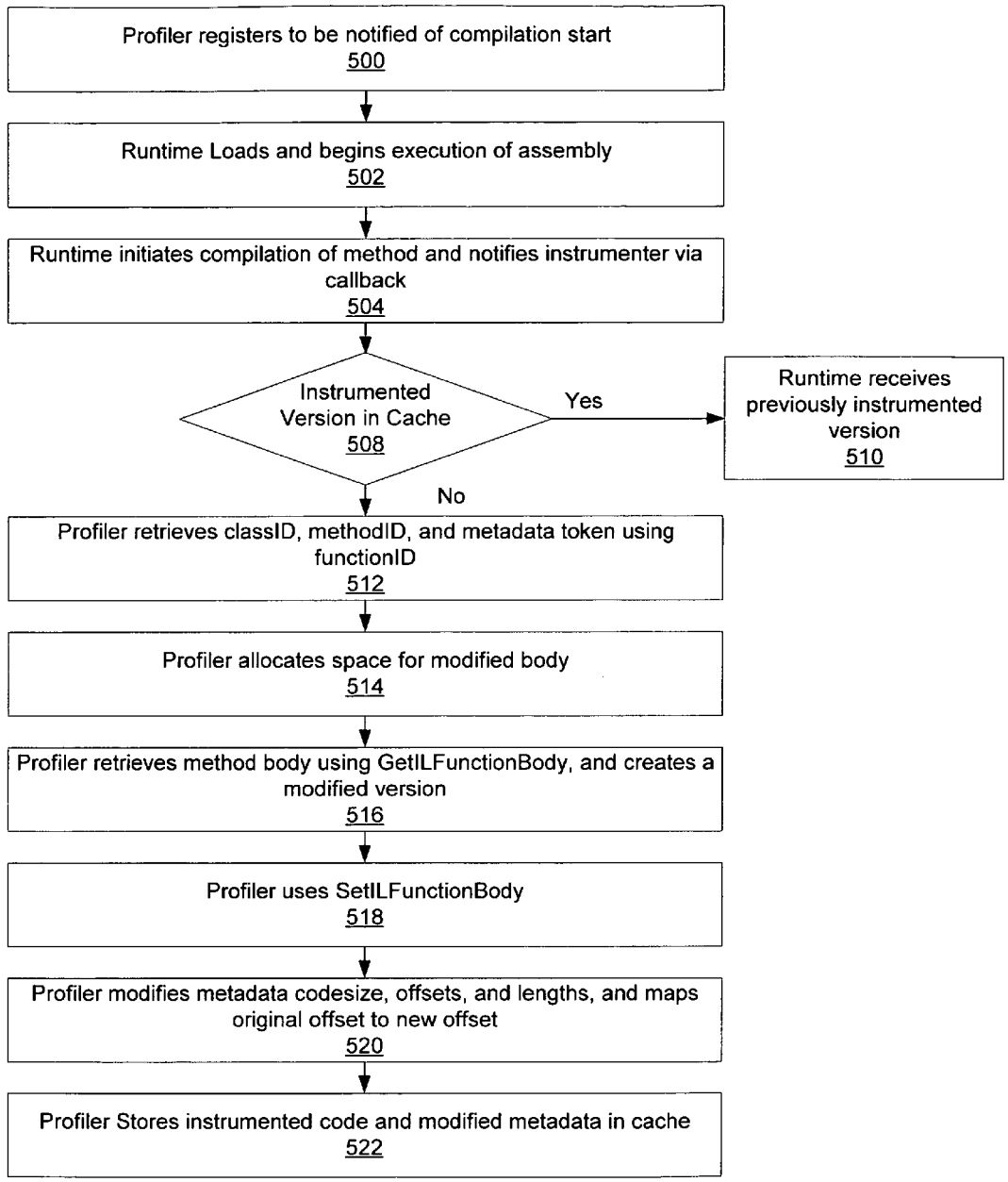
FIG. 5 illustrates one embodiment of a process for managing the instrumentation of program code.

FIG. 5 depicts one embodiment of a method for instrumenting application code. Initially, a profiler registers with the underlying system to be notified of compilation start events (block 502). It is noted that while a specific compilation start event is generally discussed herein, other events may serve as a "hook" for intercepting a compilation process.

At some later point in time, the runtime (e.g., common language runtime) loads and begins execution of an application or assembly (block 502). When the runtime initiates compilation of a method, the runtime notifies the profiler of the impending compilation (block 504). In addition, the runtime provides some identification to the profiler of the method to be compiled. The profiler then determines whether an instrumented version of the method is stored in the instrumentation cache (decision block 508). For example, the profiler may access previously generated and stored metadata to determine whether the corresponding method has been instrumented. If an instrumented version of the method is available in the instrumentation cache, it is not necessary for the profiler to again instrument the method code. Rather, the profiler directs (e.g., by setting an appropriate pointer) the runtime and/or compiler to the instrumented version (block 510).

However, if the profiler determines an instrumented version of the method is not stored in the instrumentation cache (or otherwise determines compilation of the original method code is desired or required) (decision block 508), the profiler begins an instrumentation process. In one embodiment, the profiler may use the identification (e.g., functionID) of the method provided by the notification to obtain further information regarding the method. For example, in one embodiment, the profiler may retrieve a class ID, method ID, metadata token, and any other information deemed suitable or necessary (block 512).

In one embodiment, the profiler may first allocate new space for the method body which is to be modified (block 514). However, other embodiments may be configured to work directly on the method body itself rather than a copy. The profiler may then retrieve method body (e.g., using GetILFunctionBody) and instrumented the retrieved code (block 516). The profiler may further set a pointer (e.g., via SetThFunctionBody) to the method body to point to the new modified version (block 518). Setting a pointer in this manner may have the effect of directing the compiler to the instrumented code for compilation. In addition, the profiler may modify corresponding meta to identify the location of the instrumented version (block 522), and store the instrumented version in an instrumentation cache (block 522). It is to be understood that the activities depicted in FIG. 5 may occur in a different order than that depicted, and one or more may occur concurrently. In addition, other embodiments may utilize more or fewer activities as appropriate.

In addition to the above, various embodiments are contemplated in which the instrumentation cache may be populated in various ways and at various times. For example, in the discussion above instrumentation and population of the instrumentation cache is generally described as occurring at load time, or when a given method is called during runtime. However, in other embodiments, different approaches to instrumentation and cache population may be utilized. In one embodiment, a hybrid approach to instrumentation may be utilized wherein both static and dynamic instrumentation are used. For example, some portion of an application's code may be instrumented prior to loading, while another portion of the application's code is instrumented during runtime as described above. In such an embodiment, a profiler and/or instrumenter may be operable in a standalone mode and may be operable to instrument specified assemblies, libraries, methods, or other portions of code. The instrumented code may then be stored in an instrumentation cache. In this manner, "less" instrumentation may be required at load time and/ or during runtime. Such an approach may serve to speed load time in some cases.

In one embodiment, a separate configuration file may be utilized by the profiler which indicates how and when instrumentation may be performed. For example, static instrumentation could be performed for specified DLL's, while dynamic instrumentation could be reserved for only those DLL's in a global assembly cache (GAC). All such combinations of static and dynamic instrumentation, and use of configuration files, are contemplated. In addition to the above, a mode is contemplated wherein a profiler or instrumenter may "observe" operation of a specified code. During the observation made, data may be stored which identifies various characteristics of the code being observed. Based upon the gathered characterizing data, decisions may be made as what portions of code may be instrumented. Such decisions could be made manually (i.e., by a person viewing the gathered data and making corresponding entries in a configuration file) or automatically. For example, in one embodiment, the decision as to whether a portion of code is to be instrumented could be made automatically based upon the nature of the code itself (i.e., certain types of called functions or methods may have a higher priority for purposes of instrumentation), the behavior of code during execution (i.e., some methods are called a relatively large number of time), and so on.

It is noted that the above described embodiments may comprise software. In such an embodiment, the program instructions which implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a processing system comprising a compiler and a profiler;
   a non-volatile storage device configured to store program instructions including first program instructions; and
   an instrumentation cache on the non-volatile storage device, wherein the instrumentation cache is configured to store instrumented versions of instructions included in the first program instructions in an uncompiled state;
   wherein the compiler is configured to notify the profiler of a compilation event corresponding to the first program instructions;
   wherein the profiler is configured to:
     detect the event and intercept compilation first instructions of the first program instructions;
     determine whether an instrumented version of the first instructions is currently available on the non-volatile storage device;
     in response to determining the instrumented version of the first instructions is available, instruct the compiler to compile the instrumented version of the first instructions; and
     in response to determining the instrumented version is not available:
       retrieve and instrument the first instructions;
       store the instrumented first instructions in the instrumentation cache in an uncompiled state; and
       provide the instrumented first instructions to the compiler for compilation;

wherein in response to receiving the instrumented first instructions provided by the profiler, the compiler is configured to compile the instrumented first instructions.

2. The system as recited in claim 1, wherein the profiler is configured to access the instrumentation cache on the non-volatile storage device to determine whether the instrumented version of the first program instructions is currently available.

3. The system as recited in claim 2, wherein the first program instructions comprise an intermediate language, and wherein the compiler comprises a just in time compiler.

4. The system as recited in claim 3, wherein the profiler is configured to register with the processing system to be notified of the event via a callback.

5. The system as recited in claim 2, wherein the profiler is further configured to:
maintain first metadata which indicates whether an instrumented version of program instructions is available, and a location of such an instrumented version of program instructions within the instrumentation cache.

6. The system as recited in claim 5, wherein the profiler is further configured to store second metadata which identifies a relationship between given uninstrumented program instructions and an instrumented version of the given uninstrumented program instructions, wherein the second metadata comprises a mapping of an original offset of given uninstrumented program instructions within an assembly to an offset of an instrumented version of the given program instructions.

7. The system as recited in claim 2, further comprising a profiling API of a Microsoft .NET framework, and wherein the event comprises a JITCompilationStarted event.

8. The system as recited in claim 7, wherein the first instructions correspond to a method, and wherein the profiler is configured to:
retrieve the first instructions using a GetILFunctionBody method; and
associate the instrumented version of the first instructions with the method using a SetILFunctionBody method.

9. The system as recited in claim 1, wherein the profiler is further operable to instrument program instructions and store instrumented program instructions in the instrumentation cache on the non-volatile storage device prior to loading a corresponding application for execution.

10. A method for instrumenting program instructions comprising:
maintaining an instrumentation cache on a non-volatile storage device, wherein the instrumentation cache is configured to store instrumented versions of instructions included in first program instructions in an uncompiled state;
notifying a profiler of a compilation event corresponding to first instructions of the first program instructions;
detecting the event and intercepting the compilation of the first instructions;
determining whether an instrumented version of the first instructions is currently available on the non-volatile storage device;
in response to determining the instrumented version of the first instructions is available, instructing a compiler to compile the instrumented version of the first instructions; and
in response to determining the instrumented version is not available:
retrieving and instrumenting the first instructions;
storing the instrumented first instructions in the instrumentation cache in an uncompiled state; and
providing the instrumented first instructions to the compiler for compilation;
wherein in response to receiving the instrumented first instructions provided by the profiler, the compiler compiling the instrumented first instructions.

11. The method as recited in claim 10, further comprising accessing the instrumentation cache on the non-volatile storage device to determine whether the instrumented version of the first instructions is currently available.

12. The method as recited in claim 11, wherein the first program instructions comprise an intermediate language, and the method comprises using a just in time compiler to compile program instructions.

13. The method as recited in claim 12, further comprising a profiler registering to be notified of the event via a callback.

14. The method as recited in claim 11, further comprising:
maintaining first metadata which indicates whether an instrumented version of program instructions is available, and a location of such an instrumented version of program instructions within the instrumentation cache.

15. The method as claim 14, further comprising storing second metadata which identifies a relationship between given uninstrumented program instructions and an instrumented version of the given uninstrumented program instructions, wherein the second metadata comprises a mapping of an original offset of given uninstrumented program instructions within an assembly to an offset of an instrumented version of the given program instructions.

16. The method as recited in claim 11, further comprising a profiling API of a Microsoft .NET framework, and wherein the event comprises a JITCompilationStarted event.

17. The method as recited in claim 16, wherein the first instructions correspond to a method, and wherein the method further comprises:
retrieving the first instructions using a GetILFunctionBody method; and
associating the instrumented version of the first instructions with the method using a SetILFunctionBody method.

18. The method as recited in claim 10, further comprising instrumenting program instructions of an application and storing instrumented program instructions in an instrumentation cache on the non-volatile storage device prior to loading the application for execution.

19. A computer readable medium comprising program instructions, wherein when executed the program instructions are operable to:
maintain an instrumentation cache on a non-volatile storage device, wherein the instrumentation cache is configured to store instrumented versions of instructions included in first program instructions in an uncompiled state;
notify a profiler of a compilation event corresponding to first instructions of the first program instructions;
detect the event and intercept the compilation of the first instructions;
determine whether an instrumented version of the first instructions is currently available on a non-volatile storage device;
in response to determining the instrumented version of the first instructions is available, instruct a compiler to compile the instrumented version of the first instructions; and
in response to determining the instrumented version is not available:
retrieve and instrumenting the first instructions;

store the instrumented first instructions in the instrumentation cache in an uncompiled state; and provide the instrumented first instructions to the compiler for compilation;

in response to receiving the instrumented first instructions provided by the profiler, compile the instrumented first instructions.

20. The computer readable medium as recited in claim 19, wherein the program instructions are further operable to access the instrumentation cache on the non-volatile storage device to determine whether the instrumented version of the first instructions is currently available.

21. The computer readable medium as recited in claim 20, wherein the program instructions are further operable to:

maintain first metadata which indicates whether an instrumented version of program instructions is available, and a location of such an instrumented version of program instructions within the instrumentation cache.

22. The computer readable medium as claim 21, wherein the program instructions are further operable to store second metadata which identifies a relationship between given uninstrumented program instructions and an instrumented version of the given uninstrumented program instructions, wherein the second metadata comprises a mapping of an original offset of given uninstrumented program instructions within an assembly to an offset of an instrumented version of the given program instructions.

23. The computer readable medium as recited in claim 19, wherein the program instructions are further operable to instrument program instructions of an application and store instrumented program instructions in an instrumentation cache prior to loading the application for execution.

* * * * *